(12) United States Patent
Nicholson et al.

(10) Patent No.: US 8,023,179 B2
(45) Date of Patent: Sep. 20, 2011

(54) ENHANCED CONTINUUM GENERATION IN NONLINEAR BULK OPTIC MATERIALS

(75) Inventors: Jeffrey W. Nicholson, Morristown, NJ (US); Paul S. Westbrook, Bridgewater, NJ (US)

(73) Assignee: OFS Fitel LLC, Norcross, GA (US)

( * ) Notice: Subject to any disclaimer, the term of this patent is extended or adjusted under 35 U.S.C. 154(b) by 216 days.

(21) Appl. No.: 11/724,630

(22) Filed: Mar. 15, 2007

(65) Prior Publication Data

US 2008/0225382 A1 Sep. 18, 2008

(51) Int. Cl.
*G02F 2/02* (2006.01)
*H01S 3/10* (2006.01)
(52) U.S. Cl. .................... 359/326; 385/122; 372/21
(58) Field of Classification Search .......... 385/122, 385/131; 359/326–332
See application file for complete search history.

(56) References Cited

U.S. PATENT DOCUMENTS

| | | | |
|---|---|---|---|
| 6,597,851 B2 * | 7/2003 | Johnson et al. ............. 385/131 |
| 6,684,008 B2 | 1/2004 | Young et al. | |
| 6,852,203 B1 * | 2/2005 | Kawakami et al. ....... 204/192.3 |
| 6,856,737 B1 | 2/2005 | Parker et al. | |
| 6,870,970 B2 * | 3/2005 | Leonard et al. ................ 385/5 |
| 6,901,087 B1 | 5/2005 | Richardson et al. | |
| 6,991,847 B2 | 1/2006 | Padmanabhan et al. | |
| 7,012,279 B2 | 3/2006 | Wierer et al. | |
| 7,018,467 B2 | 3/2006 | Geusic et al. | |
| 7,257,333 B2 * | 8/2007 | Rosenwald et al. ......... 398/201 |
| 2004/0028356 A1 | 2/2004 | Birks et al. | |
| 2004/0091224 A1 * | 5/2004 | Baumberg et al. .......... 385/129 |
| 2005/0047739 A1 * | 3/2005 | Parker et al. ................ 385/122 |
| 2005/0226576 A1 | 10/2005 | Feder et al. | |
| 2006/0147213 A1 * | 7/2006 | Rosenwald et al. ......... 398/121 |
| 2006/0286488 A1 * | 12/2006 | Rogers et al. ................ 430/325 |

(Continued)

FOREIGN PATENT DOCUMENTS

WO WO 2005101103 A1 * 10/2005

OTHER PUBLICATIONS

Glas et al, Supercontinuum generation in a two-dimensional photonic kagome crystal, 2005, Apply. Phys. B 81, 209-217.*

(Continued)

*Primary Examiner* — Hemang Sanghavi
(74) *Attorney, Agent, or Firm* — Wendy W. Koba

(57) ABSTRACT

In accordance with the present invention, a bulk optic material (for example, silica) is processed to form a spatially microstructured element, such as a photonic bandgap (PBG) structure. An ultra-short laser pulse source is used as an input signal that is applied to the bulk optic PBG structure to generate an enhanced continuum output. The PBG structure may comprise any type of one-, two- or three-dimensional grating structure, where the selected structure will dictate the type(s) of enhancement(s) that are present in the generated continuum—generally in the form of a broadened continuum and/or the inclusion of one or peaks in the continuum. The use of a relatively small-dimensioned bulk material allows for the continuum to be generated without the need for any type of optical confinement (waveguide). In one embodiment, the bulk PBG structure may be is subjected to one or more additional processes (such as UV exposure, electromagnetic field application, etc.) to modify the nonlinearity of the bulk optic material, in one case resulting in the reduction of the inherent chromatic dispersion and enhancement of the generated continuum.

34 Claims, 3 Drawing Sheets

U.S. PATENT DOCUMENTS

2008/0253421 A1* 10/2008 Charache et al. .......... 372/50.11

OTHER PUBLICATIONS

Garcia-Adeva, Band gap atlas for photonic crystals having the symmetry of kagome and pyrochlore lattices, New Journal of Physics 8 (2006) 86, Jun. 5, 2006.*

J. Kasparian et al. "Infrared Extension of the supercontinuum generated by femtosecond terawatt laser pulses propagating in the atmosphere" Optics Letters, Sep. 15, 2000, V. 25, #18.

Kobtsev, et al. "Influence of the modulation instability on the formation of super-continuum in tapered and cobweb fibres", Lab. of Laser Systems, Novosibirsk St. Univ. Russia.

Kumar et al. "Extruded soft glass photonic crystal fiber for ultrabroad supercontinuum generation", Optics Express, Dec. 16, 2002, vol. 10, No. 25.

Tortora et al. "Comb-like supercontinuum generation in bulk media", Applied Physics Letters, Aug. 16, 2004, vol. 85, No. 7.

Saliminia, et al. "Ultra-broad and coherent white light generation in silica glass by focused femtosecond pulses at 1.5 um", Optics Express, Jul. 25, 2005, vol. 13, No. 15.

Andreev, et al. "Nonlinear process in photonic crystals under the noncollinear interaction", Optical Society of America, Sep. 2002, vol. 19, No. 9.

Markowicz, et al. "Dramatic Enhancement of Third-Harmonic Generation in Three-Dimensional Photonic Crystals", The American Physical Society, Feb. 24, 2004, vol. 92, No. 8.

Sajeev, et al. "Photonic Bandgap Materials: towards an all-optical micro-transistor", Journal of Optics A: Pure and Applied Optics, Oct. 26, 2001.

Finlayson, et al. "Slow light and chromatic temporal dispersion in photonic crystal waveguides using femtosecond time of flight", The American Physical Society, Jan. 30, 2006.

Hansen, et al. "Supercontinuum Generation in Photonic Crystal Fibers", Crystal Fibre.

* cited by examiner

ENHANCED CONTINUUM GENERATION IN NONLINEAR BULK OPTIC MATERIALS

TECHNICAL FIELD

The present invention relates to the generation of "enhanced" (i.e., relatively high power and/or larger bandwidth) optical continuum from a bulk material and, more particularly, to the inclusion of a photonic bandgap structure within a bulk material that has been subjected to further processing to enhance the generated continuum.

BACKGROUND OF THE INVENTION

There are many applications in optical communication systems for a high power, low noise broadband light source. For example, efforts are now being made toward "spectral slicing", where a common light source is used to generate a large number of (independent) wavelength division multiplexed (WDM) optical signals. Using spectral slicing, therefore, a single light source may be employed to take the place of a multiple number of separate, narrow linewidth lasers, as was required in the prior art. Other applications for a continuum light source include, but are not limited to, frequency metrology, device characterization, dispersion measurements made on specialty fibers, and the determination of optical grating transmission characteristics. All of these various diagnostic tools may be greatly enhanced by the availability of such a broadband source.

In general, continuum generation involves the launching of relatively high power laser radiation (in most cases, pulsed radiation) into an optical material where the pulse train undergoes significant spectral broadening as a result of the nonlinearity of the material. Most prior art arrangements for providing continuum generation involve the use of highly nonlinear optical fibers, microstructured fibers and/or nonlinear planar waveguides. In each arrangement, a guiding structure is defined and used to confine the light as it passes through the nonlinear material.

Continuum light of wavelengths spanning more than one octave have been generated in microstructured and tapered optical fibers by launching light pulses having durations on the order of femtoseconds ($10^{-15}$ seconds) into the endface of the fibers. The extreme spectra thus produced are useful, for example, in measuring and stabilizing pulse-to-pulse carrier envelope phase, as well as in high-precision optical frequency combs.

It is also well known that bulk optic materials (i.e., photonic crystals) can be fabricated with periodic modulations of their refractive index. Examples include photonic bandgap (PBG) structures, in which a microstructure is patterned into a bulk optic material such that two (or more) distinct refractive indexes (e.g., air and silica) yield a periodic or quasi-periodic pattern in two or three dimensions within the waveguiding layer. In such structures, therefore, a "bandgap" results where one or more frequencies of an applied optical signal will not propagate through the bulk material. A continuum of light may also be generated by launching high power pulses through bulk materials that do not contain any type of guiding refractive index structure. Similar to guided wave continua, the chromatic dispersion of the bulk material plays a significant role in determining the continuum generation properties. One problem with such structures, however, is that there is little control over the material dispersion and, as a result, little control/flexibility in the generated continuum. Thus, a means to control the dispersion of a bulk, non-guiding material would be advantageous.

SUMMARY OF THE INVENTION

The need remaining in the prior art is addressed by the present invention, which relates to the generation of "enhanced" (i.e., relatively high power and/or larger bandwidth) optical continuum from a bulk optic material and, more particularly, to the inclusion of a photonic bandgap structure within a relatively small-dimensioned bulk material so as to generate a continuum without the need to include any light-guiding structures in the material. In one embodiment of the present invention, the bulk PBG structure is subjected to one or more additional processes (such as UV exposure, electromagnetic field application, etc.) to reduce the inherent chromatic dispersion and enhance the generated continuum.

In accordance with the present invention, a bulk optic material (for example, silica) is processed to form a photonic bandgap (PBG) structure. The structure may comprise any type of one-, two- or three-dimensional grating structure, where the selected structure will dictate the type(s) of enhancement(s) that are present in the generated continuum—generally in the form of a broadened continuum and/or the inclusion of one or more peaks in the continuum.

The bulk optic PBG continuum-generating devices of the present invention are preferably formed from an extremely highly-nonlinear bulk material (such as, for example, polystyrene, chalcogenide glasses or bismuth-doped silica glasses) which can therefore generate an extremely large bandwidth continuum output. The bulk PBG element is formed as a relatively small and compact device, on the order of the Rayleigh range of the input light, typically on the order of 1 mm or less. This small size removes the prior art need for optical confinement, that is a means to "guide" the pulses passing through the structure. Therefore, it is an aspect of the present invention that there is no need to form a waveguide within the bulk PBG continuum-generating structure. That is, a relatively small and compact section of "bare" crystal may be utilized to generate the desired continuum.

In a further embodiment of the present invention, a predetermined type of post processing treatment (for example, radiation, heating, application of a static electric field) may be performed on the bulk PBG structure to substantially alter the nonlinear properties of the bulk optic material itself, one nonlinear property being its chromatic dispersion. This alteration, therefore, allows for a bulk material to be used to provide the supercontinuum radiation without incurring the dispersion-associated problems of the prior art.

In one specific post-processing arrangement, the bulk PBG structure is subjected to post processing with actinic radiation, where the actinic radiation is known to alter the material absorption properties of the optical material. In an alternative embodiment, a post processing technique that is known to substantially alter the refractive index (and thus, the chromatic dispersion) of the material may be used, such as exposure to ultraviolet (UV) radiation.

Various other "post-processing" techniques may be used to enhance the generated continuum. For example, strain and thermal treatments may alternatively be used to modify the characteristics of the bulk material. Similarly, treatment with a strong DC electromagnetic field (perhaps accompanied by heating or straining) will alter both the linear and nonlinear properties of the bulk PBG structure. Mechanical manipulation, as well as the inclusion of various liquids or gases within the structure, may also be used to modify the nonlinear properties of the bulk material and enhance its continuum generation abilities. Any of these various techniques may be used to provide the desired changes in the nonlinear properties of the bulk PBG structure of the present invention.

Other and further advantages and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
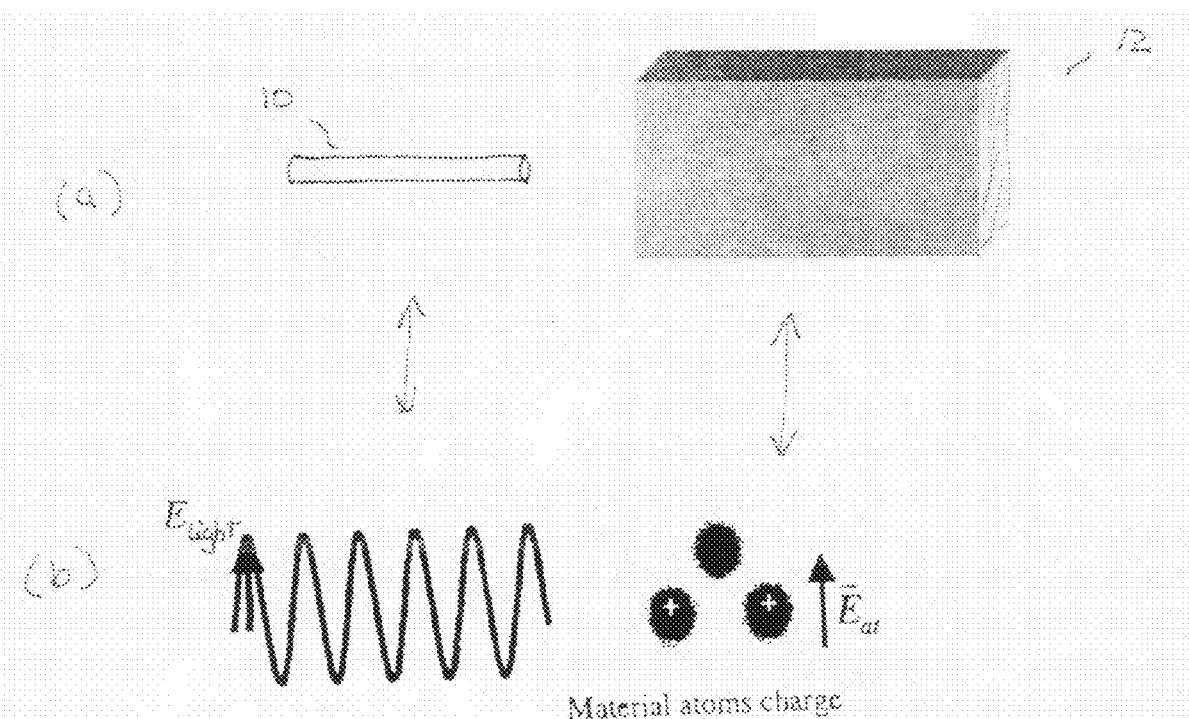
FIGS. 1(a) and 1(b) illustrate an exemplary input optical signal source and prior art bulk nonlinear optic material, on a macroscopic and microscopic level, respectively.
Figure 2:
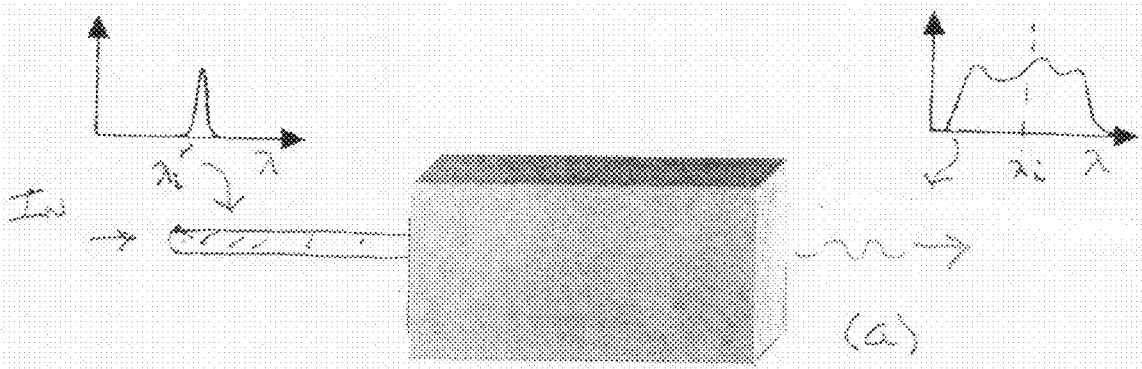
FIGS. 2(a) and 2(b) illustrate an "activated" version of the arrangement of FIG. 1, with a relatively high intensity, brief duration light pulse applied as an input to a bulk nonlinear optic material, illustrating the generation of an electromagnetic continuum, on the macroscopic and microscopic levels, respectively.
Figure 2:
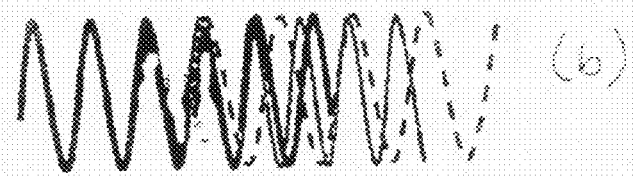

One of the most important characteristics of ultra-short laser pulse interaction with bulk material is the delivery of high energy in a very short period of time, on the order of femtoseconds, without permanently damaging the bulk structure. The light pulse itself can induce a whole range of physical phenomena as it propagates through the material. When the electric field, denoted $E_{light}$, of a laser pulse is comparable with the internal field $E_{at}$ of the atoms in the material, the laser light will "drive" the atoms and, in turn, be modified by this interaction. A simple representation of such an interaction is shown in prior art arrangements of FIGS. 1 and 2, which illustrate such a system "before" (FIG. 1) and "after" (FIG. 2) interaction of a laser beam 10 with a nonlinear bulk optic material 12. In particular, FIG. 1(a) illustrates the situation on a macroscopic level, with FIG. 1(b) illustrating the same relationship on a microscopic level. FIG. 2 illustrates, in both FIGS. 2(a) and 2(b), the generation of an additional range of wavelengths (continuum) based on the interaction of the short laser pulse with nonlinear bulk optic material 12. FIG. 2(a) illustrates this result at the macroscopic level, while FIG. 2(b) illustrates the particular interaction between wavelengths.

The interactions, as shown in FIG. 2, may take the form of pulse broadening, to the extent of continuum generation, or a particular combination of discrete input and output wavelengths, known as parametric effects. The strength of the interaction is determined not only by the laser pulse characteristics (e.g., spot size, pulse energy, pulse duration), but also by the nature of the bulk material.

A key parameter in quantifying these particular phenomena is the strength of the nonlinearity that is characterized by an intensity-dependent higher order contribution to the index of refraction, n, of bulk optic material 12, which may be defined as follows:

$$n(\lambda,r,t)=n_0(\lambda)+n_2(\lambda)\phi(r,t),$$

where $n_0(\lambda)$ is the ordinary linear refractive index of bulk material 12, $n_2(\lambda)$ is the non-linear refractive index of bulk material 12, and $\phi(r, t)$ is defined as the temporally and spatially varying intensity of the laser pulse. It is to be noted that there may also be higher order nonlinearities, which are omitted here for the sake of clarity. Indeed, with appropriate symmetry in the material, there may also be a second-order nonlinearity, giving rise to second harmonic generation. The above equation, however, only gives the case of a third-order nonlinearity as an illustrative example. The nature of the linear term has been previously described as giving rise to optical phenomena such as refraction and reflection, in which light is merely deflected or delayed but remains unchanged in terms of its frequency (wavelength). The nonlinear term is rather different and depends on both the characteristic nonlinear coefficient of the material at the laser wavelength and on the spatial-temporal characteristics of the laser pulse. The higher the nonlinear index of refraction $n_2$ and/or the higher the intensity of the laser pulse, the stronger the nonlinear effect and the greater the nonlinear contribution to the total refractive index.

Figure 3:
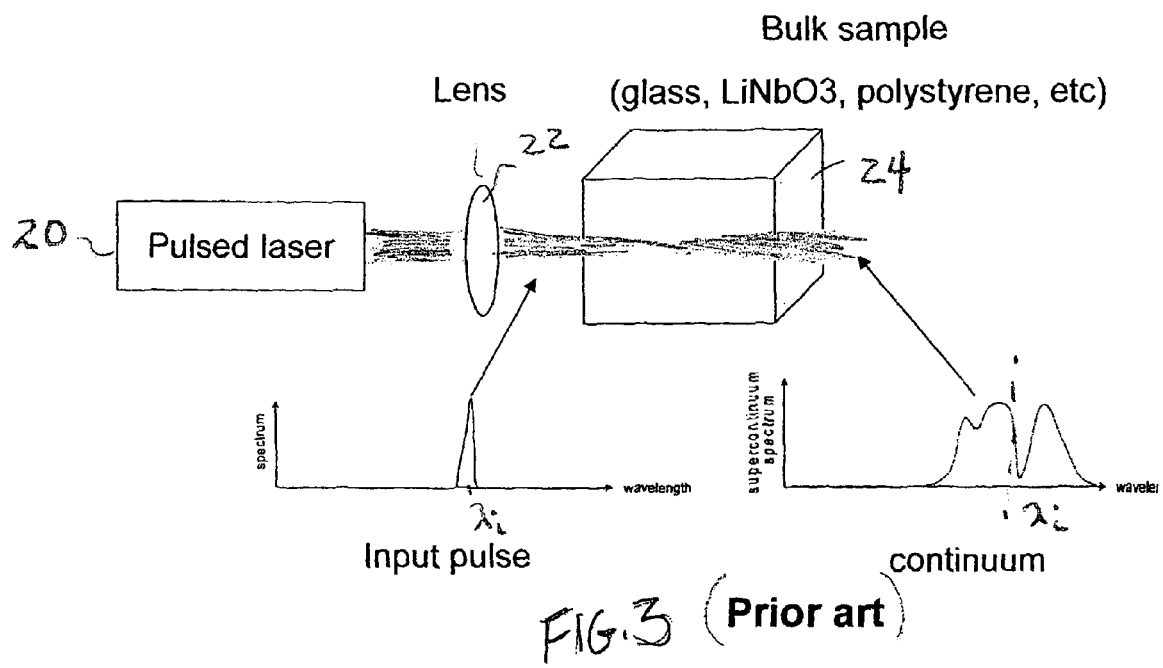
FIG. 3 illustrates a prior art continuum generation system including a laser pulse source, focusing element and a bulk optic nonlinear material element.

Thus, as shown in FIG. 2, it was known in the prior art that high intensity optical radiation, when incident on a bulk optic material, results in the generation of a continuum spectrum around the wavelength of the input signal. FIG. 3 contains a relatively simple system-level block diagram of this prior art principle. In this case, a pulsed laser source 20 is used to generate pulses that have a predetermined, relatively narrow pulsewidth centered at a predetermined initial wavelength $\lambda_i$. In most cases, source 20 generates ultra-short pulses, typically of femtosecond duration. The pulses are subsequently passed through a conventional lens 22 (optional) and focused into a bulk optic element 24. Bulk optic element 24 may comprise, for example, bulk glass, lithium niobate, polystyrene, or the like. As shown, the output radiation from bulk optic element 24 takes the form of a continuum over a relatively broad wavelength range surrounding initial wavelength $\lambda_i$. Continuum generation of this sort, as is commonly understood in the prior art, generally refers to the generation of additional spectral components outside (below and/or above) those present in the input pulse. Typically, the total continuum bandwidth is more than twice the input bandwidth, but it may also be up to ten times the input bandwidth. As also shown in FIG. 3, it is also a common result that the generated continuum exhibits nulls at various locations along the wavelength range.

As discussed above, continuum generation in such bulk structures depends on an interplay between nonlinear optical interactions and the linear dispersion of the material itself. Control of these dispersive properties has, to date, relied exclusively on the careful design and fabrication of an appropriate material, typically with very low dispersion, and a carefully-chosen zero dispersion wavelength value.

In accordance with the present invention, a bulk optic material element is modified to incorporate a photonic bandgap (PBG) structure through at least a portion of the extent of the bulk material such that the generated continuum is enhanced/modified near the photonic band edges (it is to be noted that the PBG material may be incorporated with other non-PBG material, as long as the input light passes through the PBG portion. The PBG structures themselves may be one-, two- or three-dimensional, with the particular configuration selected to produce the desired enhancement (i.e., broadened spectral range, enhanced peaks along the continuum, and the like). While many PBG structures are strictly periodic, it is also possible to incorporate deviations from this periodicity—such as single point defects, chirping the period of the modulations, and the like. Such PBG structures may also be referred to more broadly as "microstructured" materials, the "microstructure" comprises two or more "materials" (the term "materials" in this case meaning two elements having different optical properties—linear and/or nonlinear susceptibilities are different). By modulating the difference in properties between the two materials, PBG effects can be generated. Examples of such material pairs include, but are not limited to, 1) polystyrene and air (e.g., a self-assembled photonic crystal); 2) silica and polymer; 3) unirradiated germanosilicate glass and irradiated germanosilicate glass (e.g., a UV-induced grating); 4) semiconductors of two different doping levels; or 5) layers of two different dielectric materials (where "layers" is seen as including structures where a material property is varied on a continuous basis—a "graded" change of material).

It has been found that since the continuum generation is occurring in bulk PBG material, the enhancement effects induced by PBG structures themselves will also occur. This follows from the fact that the PBG structure will only alter the dispersion of the light, and it has been shown that it is the dispersion of the light near a PBG structure that gives rise to field enhancements at those wavelengths. Moreover, as mentioned above, the use of bulk optic PBG material in accordance with the present invention eliminates the need for a specific "guiding" structure (such as a waveguide or other type of confinement), since only a relatively short section of material (for example, having a length L less than 1 cm) is required to generate the desired continuum. Therefore, a relatively small and compact section of "bare" crystal, referred to as a "non-guided structure" (i.e., a microstructure material without guiding structures) may be utilized to generate the desired continuum. It is to be noted that it is possible for a high intensity beam of light to "self-focus"—or even "self-guide"—through the Kerr effect, increasing the refractive index locally in the material so as to generate a transient lens or waveguide. These effects are sometimes known as "spatial solitons" (or self-focusing). Such self-guidance does not, however, require a guiding structure.

Figure 4:
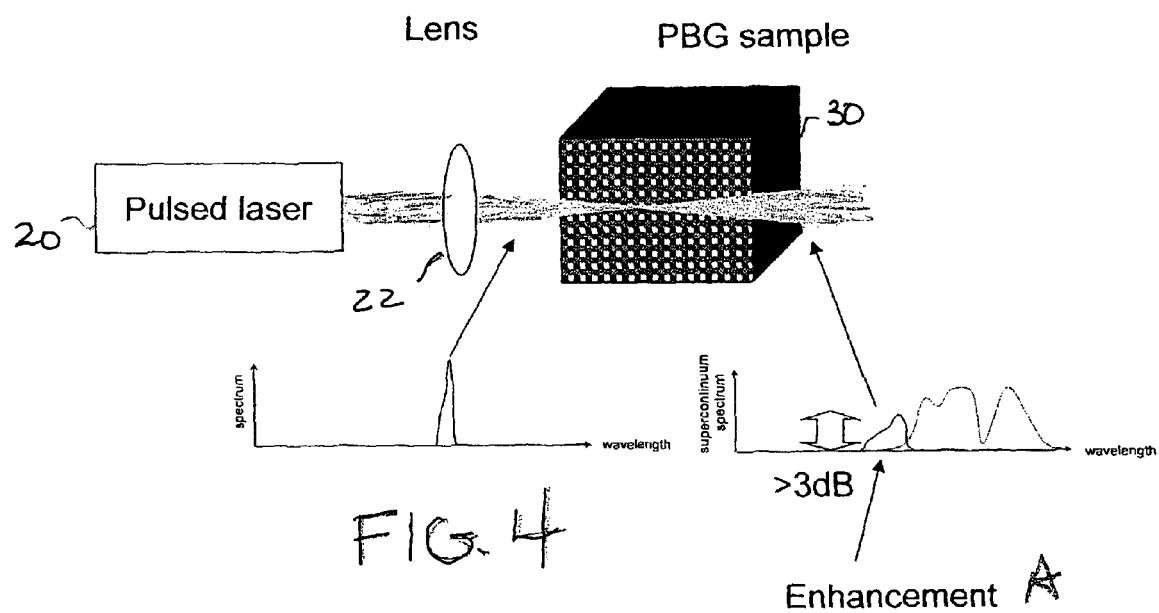
FIG. 4 illustrates a first embodiment of the present invention, utilizing a bulk optic element formed to include a photonic bandgap structure to generate an enhanced continuum.

FIG. 4 illustrates an arrangement of the present invention utilizing a bulk PBG element 30 formed as defined above. Similar to the arrangement of FIG. 3, pulsed laser source 20 and lens 22 are used to generate a pulse train and focus the pulses into bulk PBG element 30. The length L of element 30 is selected in accordance with the present invention to eliminate the need to include a waveguide or any other type of optical confinement structure. Additionally, the specific PBG structure is configured to generate a spectral broadening enhancement to the generated continuum. As shown, the specific PBG structure incorporated in bulk optic element 30 results in a greater than 3 dB addition to the short wavelength side of the original continuum, illustrated as region A in FIG. 4. Although not shown, the enhancement might also take the form of a separate spectral feature that appears completely outside of the continuum bandwidth, having no spectral overlap with the original continuum.

As another example, it is often desirable to generate a continuum in which certain wavelengths are enhanced in intensity. Typically, such enhancements are desired to be at least 3 dB above the continuum of the associated prior art nonlinear structure. It has been shown in the past that an enhancement peak can be made to appear in a one-dimensional photonic bandgap structures, such as fiber gratings in light-guiding fibers. Such one-dimensional gratings, however, are generally weak (typically with index modulations less than 0.01) and can only be fabricated in a relatively few materials (typically, glass).

Figure 5:
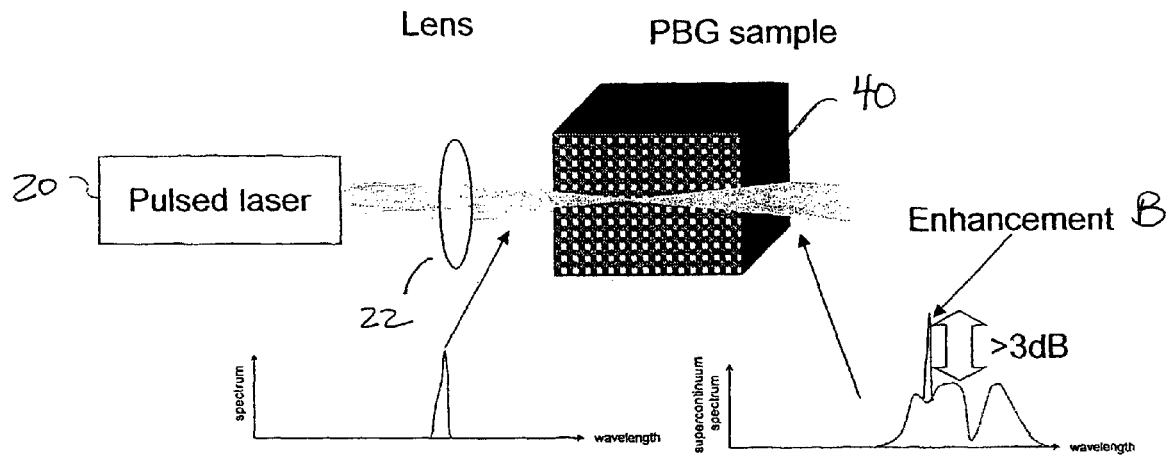
FIG. 5 illustrates an alternative embodiment of the present invention, where in this case the photonic bandgap structure included within the bulk optic material is configured to generate an enhanced peak wavelength within the continuum.

FIG. 5 illustrates another embodiment of the present invention, where in this arrangement a bulk optic material 40 is processed to form a PBG structure that is specifically configured to generate an enhanced peak signal within the continuum. That is, the formation of a PBG structure with a hole spacing comparable to the input light wavelength will exhibit a bandgap at this wavelength. The nonlinearity is sufficiently large that continuum generation will generate enhanced light at this wavelength, as shown in FIG. 5. The result is an output spectrum with enhancement peaks larger than the continuum in conventional bulk material, illustrated as enhanced peak B in the spectral diagram of FIG. 5.

In accordance with a further embodiment of the present invention, a post-fabrication process may be used (subsequent to the formation of the PBG structure itself) to modify the nonlinearities of the bulk material and further enhance the generated continuum. In one embodiment, post-processing modification takes the form of a radiation process. In particular, the basic nonlinear properties of the bulk structure are altered by using a uniform (or nearly uniform) ultraviolet (UV) radiation. By varying the exposure, the nonlinear effects within the bulk material are modified as a function of length along the material, thus modifying the characteristics of the generated continuum.

Various other "post-processing" techniques may be used in place of the exemplary UV exposure. For example, post-processing strain and thermal treatments can be used to diffuse dopants and/or "freeze" a particular strain along portions of the crystal. Thermal and strain treatments may also be used to modify the physical properties of the period PBG structure. Alternatively, treatment with strong, DC electromagnetic fields (such as poling E-fields), perhaps accompanied by heating, straining, or exposure with actinic radiation can alter the bulk material's nonlinear (as well as linear) properties. Advantageously, an electromagnetic radiation process can also generate a "tunable" nonlinearity within the material, through non-uniform or periodic alteration of the nonlinear (or linear) properties. Mechanical manipulation or incorporation of additional materials within the bulk material may also play a role in expanding the bandwidth of the created supercontinuum or in enhancing the continuum at one or more desired wavelengths.

Figure 6:
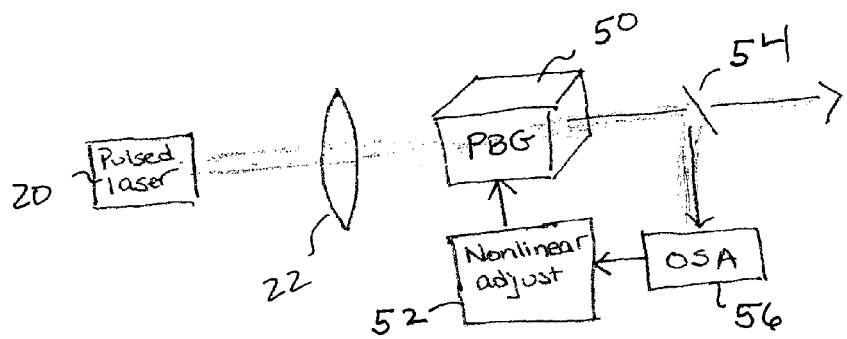
FIG. 6 contains a diagram of a system including a feedback loop to control the exhibited nonlinearity of an exemplary bulk material PBG structure of the present invention as a function of the output signal to generate an optimum continuum spectrum.

FIG. 6 illustrates an exemplary system of the present invention utilizing feedback control to create a "tunable" system in accordance with the present invention. As before, pulsed laser source 20 is utilized to supply ultra-short (e.g., femtosecond) pulses which pass through (perhaps) a lens 22 and are thereafter focused into a bulk PBG structure, in this embodiment illustrated as a post-processed PBG structure 50. In this particular example, an adjustable electromagnetic field generator 52 is coupled to PBG structure 50, where the field applied by generator 52 will modify the nonlinearity of the bulk material forming PBG structure and, as a result, modify the generated continuum. As shown in FIG. 6, a portion of the generated continuum is directed by a splitter 54 into an evaluation element 56, such as an optical spectrum analyzer (OSA). OSA 56 functions to analyze the particular characteristics of the generated continuum (for example, bandwidth, levels of peak intensities, and the like) and apply this information as a feedback signal to generator 52. In turn, generator 52 can then adjust the electromagnetic field applied to PBG structure 50 to optimize the characteristics of the generated continuum.

Mechanical manipulation, as well as the inclusion of various liquids or gases within the structure, may also be used to modify the nonlinear properties of the bulk material and enhance its supercontinuum generation abilities. Any of these various techniques may be used to provide the desired changes in the nonlinear properties of the bulk PBG structure to further modify the enhancements associated with the inclusion of a PBG structure in a bulk optic material.

It is to be noted that these various post-processing methods may be performed while monitoring the actual spectrum of light being generated by the bulk optic PBG structure. In this way, the spectrum may be trimmed, shifted or shaped to an optimum value, with desired noise reduction figures, through incorporating a feedback mechanism into the post-processing modification arrangement.

While the foregoing description represents a preferred embodiment of the present invention, it will be obvious to those skilled in the art that various modifications may be made without departing from the spirit and scope of the invention as pointed out by the following claims.

What is claimed is:

1. An optical device for generation of a continuum spectrum at the output thereof when pulsed light at a certain wavelength from a light source is launched into an input thereof, the device comprising:
    a light source of input optical pulses;
    a bulk optic material element; and
    a three-dimensional highly-nonlinear structure incorporated within the bulk optic material element having dimensions less than 1mm, said three-dimensional highly-nonlinear structure including a spatially microstructured, non-guiding portion configured to generate an enhanced continuum spectrum of relatively high power and/or larger bandwidth in response to the application of input pulses from the light source, the presence of said three-dimensional highly-nonlinear structure altering the dispersion of the input pulses passing therethrough such that the generated continuum is enhanced near the photonic band edges.

2. An optical device as defined in claim 1 wherein the three-dimensional highly-nonlinear structure comprises at least two materials differing in linear and/or nonlinear optical properties.

3. An optical device as defined in claim 2 wherein the at least two materials provide a continuous modulation of the optical properties.

4. An optical device as defined in claim 1 wherein the bulk optic element comprises a non-guiding bulk element.

5. An optical device as defined in claim 1 wherein the spatially microstructured arrangement comprises a photonic bandgap (PBG) structure.

6. An optical device as defined in claim 5 wherein the PBG structure comprises a one-dimensional PBG structure.

7. An optical device as defined in claim 5 wherein the PBG structure comprises a two-dimensional PBG structure.

8. An optical device as defined in claim 5 wherein the PBG structure comprises a three-dimensional PBG structure.

9. An optical device as defined in claim 1 wherein the generated enhanced continuum spectrum contains at least one enhanced spectral region of relatively high power greater than 3 dB above a nominal value associated with the absence of a spatially microstructured non-guided portion.

10. An optical device as defined in claim 1 wherein the spatially microstructured non-guided portion is further processed to increase the generated continuum bandwidth through the modification of the nonlinear optical properties of the highly-nonlinear structure.

11. An optical device as defined in claim 10 wherein the optical device is subjected to a radiative post-formation process to modify the nonlinearities of the three-dimensional highly-nonlinear structure.

12. An optical device as defined in claim 10 wherein the optical device is subjected to a thermal post-formation process to modify the nonlinearities of the three-dimensional highly-nonlinear structure.

13. An optical device as defined in claim 10 wherein the optical device is subjected to a static electric field post-formation process to modify the nonlinearities of the three-dimensional highly-nonlinear structure.

14. An optical device as defined in claim 1 wherein the spatially microstructured, non-guiding portion is further processed to increase the generated continuum bandwidth through the modification of the linear optical properties of the highly-nonlinear structure.

15. An optical system for generating a continuum spectrum, the system comprising
    an input light source for generating light pulses at a predetermined input wavelength;
    a bulk optic material element coupled to the output of the input light source; and
    a three-dimensional highly-nonlinear structure incorporated within the bulk optic material element having dimensions less than 1mm, said three-dimensional highly-nonlinear structure comprising a spatially microstructured, non-guiding portion configured to generate an enhanced continuum spectrum of relatively high power and/or larger bandwidth in response to the input light pulses, the presence of the three-dimensional highly-nonlinear structure altering the dispersion of the input pulses passing therethrough such that the generated continuum is enhanced near the photonic band edges.

16. An optical system as defined in claim 15 wherein the three-dimensional highly-nonlinear structure comprises at least two materials differing in linear and/or nonlinear optical properties.

17. An optical system as defined in claim 16 wherein the at least two materials provide a continuous modulation of the optical properties.

18. An optical system as defined in claim 15 wherein the bulk optic element comprises a non-guiding bulk element.

19. An optical system as defined in claim 15 wherein the spatially microstructured, non-guiding portion comprises a photonic bandgap (PBG) structure.

20. An optical system as defined in claim 19 wherein the PBG structure comprises a one-dimensional PBG structure.

21. An optical system as defined in claim 19 wherein the PBG structure comprises a two-dimensional PBG structure.

22. An optical system as defined in claim 19 wherein the PBG structure comprises a three-dimensional PBG structure.

23. An optical system as defined in claim 16 wherein the generated enhanced continuum spectrum contains at least one enhanced spectral region of relatively high power greater than 3 dB above a nominal value associated with the absence of a spatially microstructured, non-guiding portion within the bulk optic material element.

24. An optical system as defined in claim 15 wherein the system further comprises a focusing lens disposed between the input light source and the bulk optic material element.

25. An optical system as defined in claim 15 wherein the input light source generates high intensity femtosecond light pulses at a predetermined input wavelength.

26. An optical system as defined in claim 15 wherein the system further comprises a post-processing element coupled to the bulk optic material element for introducing a modification in the nonlinear properties of the three-dimensional highly-nonlinear structure incorporated within the bulk optic material element.

27. An optical system as defined in claim 26 wherein the post-processing element utilizes a radiation process to modify the nonlinear properties of the three-dimensional highly-nonlinear structure incorporated within the bulk optic material element.

28. An optical system as defined in claim 27 wherein the radiation comprises the utilization of a UV exposure process.

29. An optical system as defined in claim 27 wherein the radiation comprises the utilization of actinic radiation.

30. An optical system as defined in claim 26 wherein the post-processing element utilizes an application of an electromagnetic field to modify the nonlinear properties of the three-dimensional highly-nonlinear structure incorporated within the bulk optic material element.

31. An optical system as defined in claim 26 wherein the post-processing element utilizes a thermal treatment to modify the nonlinear properties of the three-dimensional highly-nonlinear structure incorporated within the bulk optic material element.

32. An optical system as defined in claim 26 wherein the post-processing element applies a mechanical force to the three-dimensional highly-nonlinear structure to modify the nonlinear properties thereof.

33. An optical system as defined in claim 15 wherein the system further comprises a feedback arrangement coupled between the bulk optic material element and the post-processing element to continuously adjust the nonlinearity and subsequently-generated enhanced continuum to form a tunable, enhanced continuum output signal.

34. An optical system as defined in claim 33 wherein the feedback arrangement comprises
   an optical splitter for directing a relatively small portion of the propagating output, enhanced continuum signal into the feedback arrangement;
   an optical evaluation element, responsive to the relatively small portion of the propagating output continuum signal, for analyzing the characteristics of the continuum and generating an enhanced continuum control signal therefrom, wherein the enhanced continuum control signal is applied as a control element to the post-processing element for adjusting the signal applied to the bulk optic material element and thus modify the nonlinearity of the three-dimensional highly-nonlinear structure incorporated therein.

* * * * *